(12) United States Patent
Bister et al.

(10) Patent No.: US 9,043,606 B2
(45) Date of Patent: May 26, 2015

(54) APPARATUS FOR VERIFYING AND FOR GENERATING AN ENCRYPTED TOKEN AND METHODS FOR SAME

(71) Applicant: NERO AG, Karlsbad (DE)

(72) Inventors: Daniel Bister, Ettlingen (DE); Jens Fangmeier, Karlsruhe (DE); Andreas Eckleder, Malsch (DE)

(73) Assignee: NERO AG, Karlsruhe (DE)

( * ) Notice: Subject to any disclaimer, the term of this patent is extended or adjusted under 35 U.S.C. 154(b) by 0 days.

(21) Appl. No.: 14/269,046

(22) Filed: May 2, 2014

(65) Prior Publication Data

US 2014/0245022 A1   Aug. 28, 2014

Related U.S. Application Data

(60) Division of application No. 13/112,367, filed on May 20, 2011, now Pat. No. 8,719,583, which is a continuation of application No. PCT/EP2009/006295, filed on Aug. 31, 2009.

(60) Provisional application No. 61/116,741, filed on Nov. 21, 2008.

(51) Int. Cl.
| | |
|---|---|
| *H04L 29/06* | (2006.01) |
| *G06F 21/10* | (2013.01) |
| *H04L 9/30* | (2006.01) |
| *H04L 9/32* | (2006.01) |

(52) U.S. Cl.
CPC ............ *H04L 63/0807* (2013.01); *G06F 21/10* (2013.01); *H04L 9/304* (2013.01); *H04L 9/3213* (2013.01); *H04L 2209/16* (2013.01); *H04L 2209/26* (2013.01)

(58) Field of Classification Search
CPC . H04L 63/0428; H04L 63/0807; G06F 9/468; H04W 12/06
See application file for complete search history.

(56) References Cited

U.S. PATENT DOCUMENTS 5,341,371 A  *  8/1994  Simpson ..................... 370/438
7,178,025 B2      2/2007  Scheidt et al.
7,570,781 B2 *   8/2009  Rhoads et al. ............... 382/100

(Continued)

OTHER PUBLICATIONS

Courtois, et al., "How to Achieve a McEliece-Based Digital Signature Scheme", 7th Int'l Conference on the Theory and Application of Cryptology and Information Security, Gold Coast, Australia, Dec. 2001, pp. 157-174.

*Primary Examiner* — Dede Zecher
*Assistant Examiner* — Abdullah Almamun
(74) *Attorney, Agent, or Firm* — Michael A. Glenn; Perkins Coie LLP

(57) ABSTRACT

Embodiments show an apparatus for verifying a validity of an encrypted token associated to a product, wherein the apparatus has a decryptor for decrypting an encrypted token using a decryption key to obtain a decrypted token having information bits related to the product and structure bits. The apparatus further has an evaluator for evaluating whether the structure bits fulfill a predetermined condition, wherein the encrypted token is verified to be valid when the predetermined condition is fulfilled or is not verified to be valid when the predetermined condition is not fulfilled. Further embodiments show an apparatus for generating an encrypted token associated to a product, wherein the apparatus has a plain token generator and an encryptor for encrypting the plain token using an encryption key to obtain an encrypted token.

7 Claims, 12 Drawing Sheets

(56) References Cited

U.S. PATENT DOCUMENTS

| | | | |
|---|---|---|---|
| 7,809,644 B2 * | 10/2010 | Stefik et al. | 705/51 |
| 7,822,685 B1 | 10/2010 | O'Toole, Jr. | |
| 2002/0162000 A1 | 10/2002 | Benzler | |
| 2003/0084292 A1 * | 5/2003 | Pierce et al. | 713/168 |
| 2003/0149670 A1 | 8/2003 | Cronce | |
| 2004/0098597 A1 | 5/2004 | Giobbi | |
| 2005/0010788 A1 | 1/2005 | Craft | |
| 2006/0085860 A1 | 4/2006 | Zou et al. | |
| 2008/0141357 A1 * | 6/2008 | Deligne et al. | 726/9 |
| 2009/0327139 A1 * | 12/2009 | Shah et al. | 705/71 |

* cited by examiner

| Row | 46 | 42 | 44 | 48 | 49 |
|---|---|---|---|---|---|

Row 1: XXXX . XXXXXXXXXX . XXXXXX . XX . XX  (46, 42, 44, 48, 49)

Row 2: 0111 . XXXXXXXXXX . XXXXXX . XX . XX  (46, 42) — bracket labeled 7

Row 3: 0111 . 10 XXXXXXXX . XXXXXX . XX . XX

Row 4: 0111 . 1000100000 . XXXXXX . XX . XX  (44)

Row 5: 0111 . 1000100000 . 0111AB . AB . XX  (44, 48)

```
6    0111.1000100000.011100.00.00
7    0111.1000100000.011100.00.01
8    0111.1000100000.011100.00.10
9    0111.1000100000.011100.00.11

10   0111.1000100000.011101.01.00
11   0111.1000100000.011101.01.01
12   0111.1000100000.011101.01.10
13   0111.1000100000.011101.01.11

14   0111.1000100000.011110.10.00
15   0111.1000100000.011110.10.01    Row
16   0111.1000100000.011110.10.10    ←16
17   0111.1000100000.011110.10.11

18   0111.1000100000.011111.11.00
19   0111.1000100000.011111.11.01
20   0111.1000100000.011111.11.10
21   0111.1000100000.011111.11.11
```
24 bits 22 bits 22   0111.0100101011100110 01   (46, 10)

FIG 8

APPARATUS FOR VERIFYING AND FOR GENERATING AN ENCRYPTED TOKEN AND METHODS FOR SAME

CROSS-REFERENCE TO RELATED APPLICATIONS

This application is a divisional of U.S. application Ser. No. 13/112,367, filed May 20, 2011, which is incorporated herein by reference in its entirety, which is a continuation of copending International Application No. PCT/EP2009/006295, filed Aug. 31, 2009, which is incorporated herein by reference in its entirety, and additionally claims priority from U.S. Patent Application No. 61/116,741, filed Nov. 21, 2008 which is incorporated herein by reference in its entirety.

BACKGROUND OF THE INVENTION

The present invention relates to an apparatus for verifying a validity of an encrypted token and to an apparatus for generating such an encrypted token as well as to methods for verifying such an encrypted token and a method for generating an encrypted token. Embodiments of the invention particularly relate to an encrypted token associated to a product, for example, a computer program or software product. In this case the encrypted token may be a serial number of the software product.

User specific tokens to authorize access to a technical system are widely used, for example, in the information technology (IT). While such tokens exist as either personalized or as anonymous access keys, one of the most crucial aspects is the security.

Typically, public key cryptography is used to digitally sign or encrypt the token such as to allow an access control mechanism of a technical system to verify the authenticity of said token. The length of the key (the number or size in bits) used for creating the signature/encrypting the token corresponds directly to the achieved level of security. In many applications for user specific tokens, the maximum size of such tokens is limited to a certain number of bits. This is to ensure that they are easy to transmit or comfortable for handling, e.g. when the token has to be entered manually into a technical system.

A signed user specific token consists of an arbitrary number of payload bits and a minimum number of signature bits determined by the signing/encryption algorithm used. Insecure user specific tokens or user access keys for technical systems, e.g. for software products, can lead to an illegal use of such technical systems. Based on such an insecure token, an illegal user may be able to build an own key or token generator and thus, create own access keys for the technical system.

Therefore, signing/encryption algorithms should be used which guarantee a high level of security. Thus, cryptographic methods are applied to generate encrypted user specific tokens and to verify such user specific tokens.

Nowadays, often public/private key cryptography is used for encrypting or decrypting such user specific tokens by means of a private and a public key. Typical public key cryptosystems are, for example, the RSA-cryptosystem, the McEliece cryptosystem applying a Goppa code or the Niederreiter-cryptosystem. These cryptosystems are asymmetric key algorithms with a public key and a private key. These keys are used to encrypt and decrypt messages, for example, user specific tokens or access keys.

In the publication "How to Achieve a McEliece-based Digital Signature Scheme" of Nichols Courtois et al., a method is described to build a practical signature scheme based on coding theory. However, according to this article, the access key size (user specific token) and the finding costs remain high. Furthermore, if the access key size is reduced, the calculation time for verifying the validity of the signature may increase, e.g. up to 30 s.

According to the publication, a method based on a Niederreiter algorithm is described to generate a digital signature. If D is a document and H a hash function, then S is defined as the hash value of the document D. This means that S=H (D) is valid. If i is a counter variable, which starts with 0 counted up, this means i=0, 1, 2, 3, 4, etc., then D|i is the concatenation if i is connected to the document D as a bit structure and $S_i$ is defined as the hash value $S_i$=H (D|i). The variable i is counted up until a hash value $S_i$ is obtained, which can be encrypted with the secret key. Then, $t_i$ represents the value, which is obtained if $S_i$ is encrypted with the secret key. The signature of the document D is then $t_i$|i, this means that the concatenation of $t_i$ with the value i. Document D with the signature is the value D|$t_k$|i. If the signature method is now applied to the serial number and 54 bits of information shall be protected with cryptographic security, then the Niederreiter method with the parameter m=16 and t=9 results in a signature with an average length of 144 bits. Then the encrypted serial number comprises an average length of 144+54=198 bits. This means that in the most favorable case, the encrypted serial number comprises a length of 180 bits. The probability that the length of the encrypted serial number comprises more than 204 bits is almost zero.

In order to encrypt a cryptographically secure serial number, for example, with 54 bit information, the encrypted serial number comprises an average length of 198 bits according to the method described from Courtois et al. In contrast, the inventive methods and apparatus described herein generate for a serial number with 54 bit information normally an encrypted serial number with 140 bits. This means that the length of the encrypted serial number or the encrypted token may be shorter than by the proposed method described by Courtois et al. Furthermore, the method described by Courtois et al. does not propose a concept of scalable security. Courtois et al. describes the possibility to change the proposed method in order to reduce the length of the encrypted token to an average of 159 bits. However, in this case, the computing time in order to verify the validity of the encrypted serial number is drastically increased up to 30 seconds. In contrast, the computing time for the validation of an encrypted token according to embodiments of the invention may only comprise some milliseconds.

SUMMARY

According to an embodiment, an apparatus for verifying a validity of an encrypted token associated to a product may have a decryptor for decrypting an encrypted token using a decryption key to acquire a decrypted token having information bits related to the product and structure bits; an evaluator for evaluating whether the structure bits fulfill a predetermined condition, wherein the encrypted token is verified to be valid when the predetermined condition is fulfilled or is not verified to be valid when the predetermined condition is not fulfilled; a product access processor for interpreting the information bits and for determining a level of product access in accordance with the information bits when the encrypted token is verified to be valid; wherein the product access processor is configured to process a variable number of bits in the decrypted token and to determine a higher level of product access when a number of information bits is low and to determine a lower level of product access when a number of information bits is comparatively high; and wherein a higher level of product access allows a user to use more, more expensive or more complicated functions of the product and a lower level of product access allows the user to use less, less expensive or less complicated functions of the product.

According to another embodiment, an apparatus for generating an encrypted token associated to a product may have a plain token generator for generating a plain token, wherein the plain token generator is configured to generate a plain token having information bits related to the product; wherein the plain token generator is configured to generate a plain token having structure bits related to a predetermined condition for verifying a validity of the encrypted token; wherein the plain token generator is configured to generate structure bits, which fulfils a predetermined condition; an encryptor for encrypting the plain token using an encryption key to acquire an encrypted token; and wherein the plain token generator is configured to determine a higher number of information bits when a first subset of functions of the product having less, less expensive or less complicated functions to be usable, is generated and to determine a lower number of information bits when a second subset of functions of the product having more, more expensive or a more complicated functions to be usable, is generated. device According to another embodiment, a method for verifying a validity of an encrypted token associated to a product may have the steps of decrypting an encrypted token using a decryption key to acquire a decrypted token having information bits related to the product and to structure bits; and evaluating whether the structure bits fulfill a predetermined condition, wherein the encrypted token is verified to be valid when the predetermined condition is fulfilled or is not verified to be valid when the predetermined condition is not fulfilled; determining a level of product access in accordance with the information bits when the encrypted token is verified to be valid; wherein a higher level of product access is determined when a number of information bits is low and a lower level of product access is determined when a number of information bits is comparatively high; and wherein a higher level of product access allows a user to use more, more expensive or more complicated functions of the product and a lower level of product access allows the user to use less, less expensive or less complicated functions of the product.

According to another embodiment, a method for generating an encrypted token associated to a product may have the steps of generating a plain token having information bits related to the product and having structure bits related to a predetermined condition for verifying a validity of the encrypted token, wherein the structure bits fulfill the predetermined condition; and encrypting the plain token using an encryption key to acquire an encrypted token; and wherein the step of generating is configured to determine a higher number of information bits when a first subset of functions of the product having less, less expensive or less complicated functions to be usable, is generated and to determine a lower number of information bits when a second subset of functions of the product having more, more expensive or a more complicated functions to be usable, is generated.

According to another embodiment, a computer program may have a program code for performing one of the above-mentioned methods, when the computer program runs on a computer.

According to some embodiments of the present invention, an apparatus for verifying a validity of an encrypted token associated to a product is provided. The apparatus may comprise a decryptor for decrypting an encrypted token using a decryption key to obtain a decrypted token having information bits related to the product and structure bits. Furthermore it may comprise an evaluator for evaluating whether the structure bits fulfill a predetermined condition, wherein the encrypted token is verified to be valid when the predetermined condition is fulfilled or is not verified to be valid when the predetermined condition is not fulfilled.

In accordance with other embodiments of the present invention, an apparatus for generating an encrypted token associated to a product is provided. The apparatus comprises a plain token generator for generating a plain token, wherein the plain token generator is configured to generate a plain token having information bits related to the product and having structure bits related to a predetermined condition for verifying a validity of the encrypted token and wherein the plain token generator is configured to generate structure bits, which fulfill the predetermined condition. The apparatus further comprises an encryptor for encrypting the plain token using an encryption key to obtain an encrypted token.

According to another embodiment of the present invention, a method for generating an encrypted token associated to a product and a method for verifying a validity of an encrypted token associated to a product are described.

In accordance with some embodiments, a user specific token or an encrypted token with scalable security can be generated. With a given number of bits and a given payload or useful information, all bits of a token not required for encoding the payload can be used to increase the security with respect to an illegal attack. According to another embodiment, a variable number of structure bits being part of the decrypted token may be used to achieve a scalable security. A predetermined condition for verifying the validity of an encrypted token may depend on random bits being part of the decrypted token and which are needed to generate an encrypted token. According to another aspect of the invention, the level of the security of an encrypted token generated by the inventive apparatus for generating an encrypted token and by the method for generating an encrypted token may depend on the price, the complexity or the number of features or functions of a product whose access is permitted by the encrypted token. In accordance with some embodiments, a public key may be used to decrypt an encrypted token and a private key may be used to generate an encrypted token based on a plain token.

BRIEF DESCRIPTION OF THE DRAWINGS

Embodiments of the present invention will now be described, by way of example, with reference to the accompanying drawings, in which:

FIG. 8 shows an example for generating an encrypted user specific token;

DETAILED DESCRIPTION OF THE INVENTION

Figure 1:
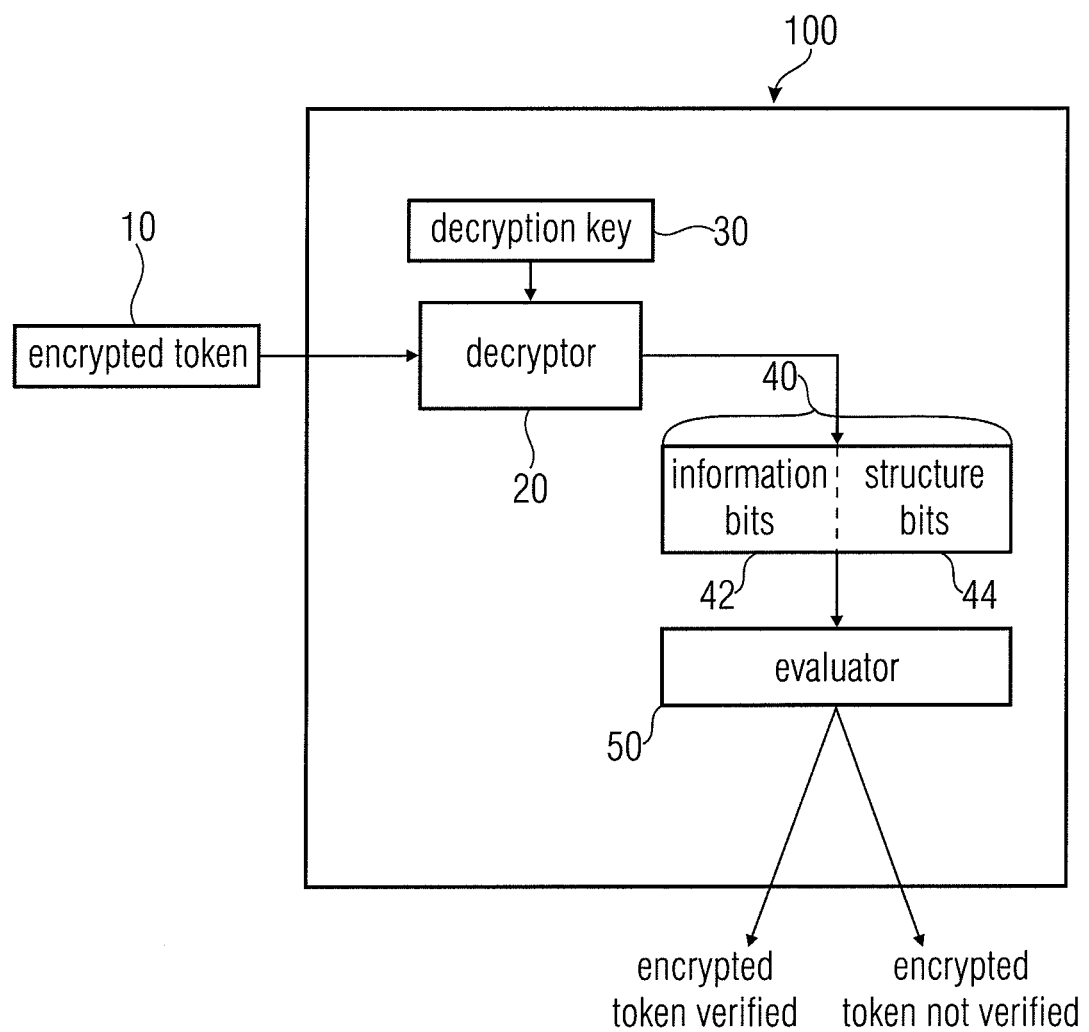
FIG. 1 shows a block diagram of an apparatus for verifying a validity of an encrypted token associated to a product according to an embodiment.

With reference to the following description of the embodiments of the present invention, it is to be noted that for simplification reasons, the same reference numerals will be used in the different Figs. for functionally, identically or similarly acting or functionally equal or equivalent elements or steps throughout the description.

In FIG. 1, an apparatus 100 for verifying a validity of an encrypted token 10 associated to a product according to an embodiment of the invention is depicted in a block diagram. The apparatus 100 comprises a decryptor 20 for decrypting an encrypted token 10 using a decryption key 30 to obtain a decrypted token 40 having information bits 42 related to the product and structure bits 44. In addition, the apparatus 100 comprises an evaluator 50 for evaluating whether the structure bits 44 fulfill a predetermined condition, wherein the encrypted token 10 is verified to be valid when the predetermined condition is fulfilled or is not verified to be valid when the predetermined condition is not fulfilled. An encrypted token associated to a product or a technical system is fed automatically or manually to a decryptor for decrypting the encrypted token. For the purpose of illustration, the encrypted token 10 may be associated to a software product or a computer program, but it is also applicable to other products or technical systems. In accordance with this example, the encrypted token 10 may be a serial number of this software product. A user who wants to install this software product on his computer may have to enter his user specific encrypted token or serial number in a computer to work with the software.

A serial number may comprise a sequence of numbers and numerals, e.g. A4HK-7BCH-PE23-KL7H-YC72. The encrypted serial number may be decoded in a binary number by the decryptor. Then the encrypted binary number can be decrypted by means of the decryptor using a public/private key method. The set of serial numbers can be divided in two disjunctives sets—the set G of valid serial numbers and the set U of invalid serial numbers. If serial numbers are used two algorithms are needed, first a validation algorithm to prove whether a serial number is valid and second a generation algorithm which is able to generate the set G of valid serial numbers.

A decryptor 20 decrypts the encrypted token by means of a decryption key to obtain the corresponding decrypted token. The decryptor 20 may be configured to perform a certain method for decrypting an encrypted token. According to embodiments, the decryptor 20 may be configured to use a public/private key cryptosystem. Such a public/private key cryptosystem may, for example, be the Niederreiter cryptosystem. In other embodiments, other public/private key cryptosystems may be used, e.g. the RSA cryptosystem, the McEliece cryptotsystem etc. According to some embodiments the decryptor 20 decrypts the encrypted token by means of the public key of the cryptosystem. Turning back to the embodiment related to the software product, the public key may be stored on a (online-) database, which is accessible for everybody, i.e. the public. The public key may be allocated to the public by the vendor of a software product. Alternatively, the same public key may be stored on a storage medium, for example, a CD, DVD, etc. on which the software package is stored. A user of the software package may now enter the serial number of the software product on the keyboard of his computer and the decryptor algorithm may decrypt, by means of the public key, which may be stored on the storage medium or in the software program or which may be downloaded from a public accessible database, the encrypted token.

The decryptor 20 decrypts the encrypted token using a decryption key 30 to obtain a decrypted token 40. This decrypted token comprises information bits 42, wherein the information bits relate to the product, for example, to the software release or version number of the software product and to structure bits 44. According to some embodiments, the number of structure bits 44 may be related to the level of security for the associated product, for example, to the software product. By a Brute-force attack, an unauthorized user randomly tries different encrypted tokens. Hence, if the number of structure bits is chosen too small, for example, 16, the Brute-force attack can succeed. At the present time, about 70 to 100 bits, for example, 80 bits are considered as cryptographically secure.

According to another embodiment, the decryptor 20 is configured to decrypt the encrypted token 10 so that the decrypted token 40 comprises a larger number of bits than the encrypted token 10. The decryptor 20 may make use of a Niederreiter cryptosystem in order to decrypt the encrypted token so that the decrypted token comprises a larger number of bits than the encrypted token.

The evaluator 50 may be configured to evaluate whether the structure bits in the decrypted token 40 fulfill a predetermined condition. If the predetermined condition of the structure bits is fulfilled, the encrypted token is verified to be valid. This means that if the encrypted token, for example, the serial number for a software product is verified to be valid, a user of the software gains access to install or to use the software product. In contrast, the encrypted token or the serial number is not verified to be valid when the predetermined condition is not fulfilled. As a consequence, a user cannot use the software product.

Such a predetermined condition, which is proven by the evaluator 50, may, for example, be a certain bit combination. Such a predetermined condition may, for example, be that a first portion of the structure bits is a copy of another portion of the decrypted token and the remaining bits comprise "1" or "0". The evaluator 50 may comprise an evaluation algorithm, which checks whether the structure bits 44 comprise the needed structure, i.e. the predetermined condition. If this condition is fulfilled, then the encrypted token or serial number is valid.

Figure 2A:
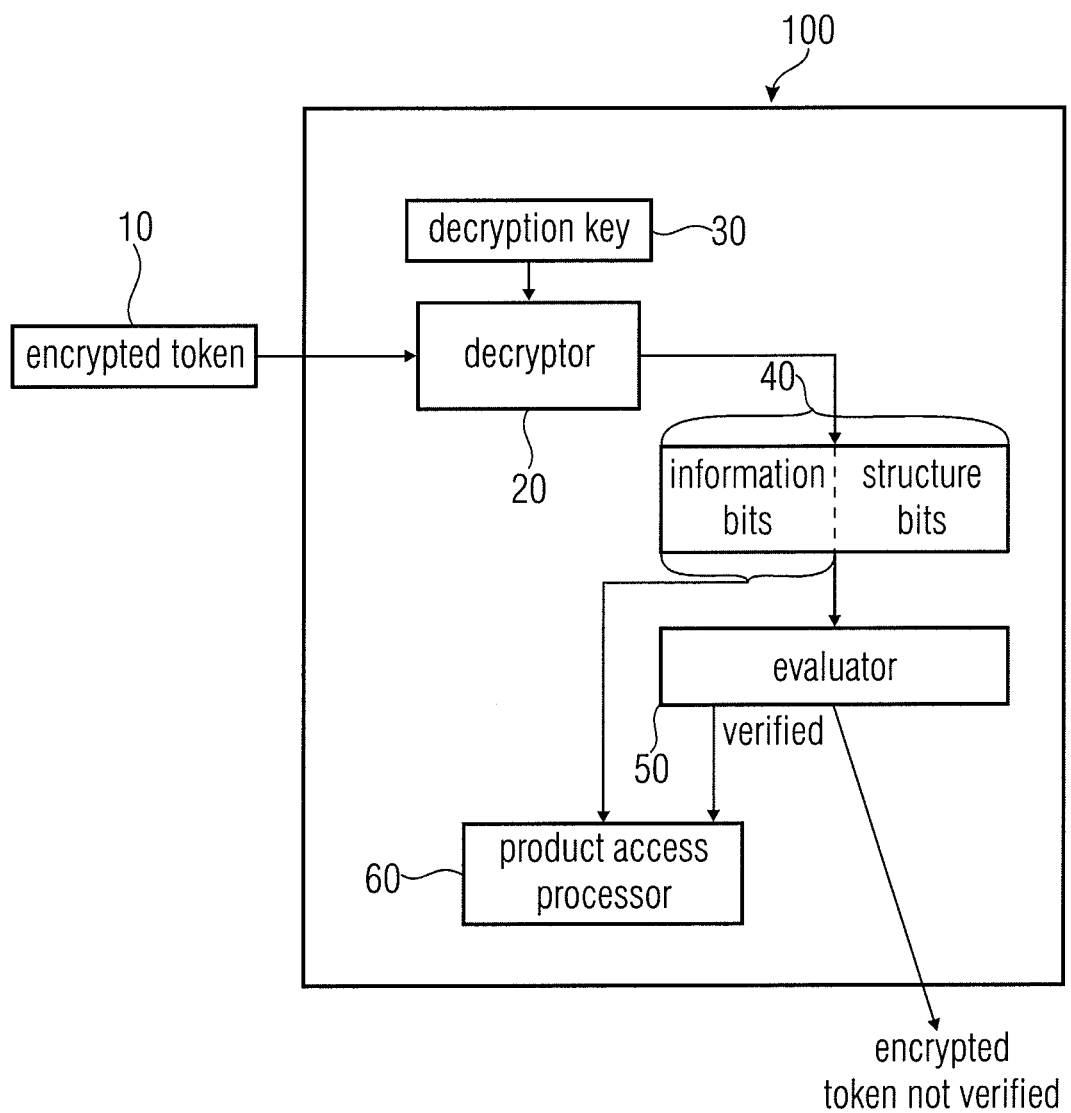
FIG. 2a shows a block diagram of an apparatus for verifying a validity of an encrypted token comprising a product access processor according to an embodiment of the invention.

In FIG. 2a, another block diagram of an apparatus 100 for verifying a validity of an encrypted token 10 associated to a product according to an embodiment of the invention is depicted. In this embodiment, the apparatus 100 further comprises a product access processor 60. This product access processor 60 is configured for interpreting the information bits 42 of the decrypted token 40 and for determining a level of product access in accordance with information bits when the encrypted token 10 is verified to be valid. As mentioned above, according to embodiments, the information bits may carry information concerning the product. Such information about a product, for example, software product, may concern certain features or functionalities of the software product. A first bit of the information bits 42 can, for example, be related to a software option as to whether a user of the software product is allowed to play Blu-Ray discs with the software product, a second bit of the information bits may, for example, be determine as to whether the user is allowed to burn a Blu-Ray disc. This means, that the information bits can be related to the product, and according to some embodiments, to product-related functions or features. Such a feature may be, for example, a test period time for a free trial version of the software product or the like.

In an embodiment, the product access processor 60 is configured to process a variable number of bits of the decryptor token. Furthermore it is configured to determine a higher level of product access when the number of information bits 42 is low and to determine a lower level of product access when the number of information bits 42 is comparatively high. A higher level of product access may allow a user of the product, e.g. the software product, to use more, more expensive or more complicated functions of the product. In contrast, a lower level of product access may allow a user to use only less, less expensive or less complicated functions of the product. According to some embodiments, the number of information bits in the decrypted token may be varying. If the number of information bits is low, a high level of product access may be granted to a user and if a number of information bits is comparatively high only a low level of product access is granted. This means, for example, two information bits in a decrypted token may be sufficient to allow a user complete access to all functionalities of the software product and three information bits in a decrypted token may grant a user just a limited access to the functionalities of the software product. In general, a higher level of product access may be related to more functions or features of a product, more expensive functions or features or more complicated functions or features of the product. Accordingly, a lower level of product access allows a user the use of less functions or features, less expensive functions or features or less complicated functions or features of the product. In other embodiments, a higher level of product access may be related to an importance of the functionality for the majority of users of the product. For example, the storage of a document written with a text processing software on a computer may be such an important feature of a software product. If the decrypted token comprises a low number of information bits, a user of the text processing software may be allowed to store a written document and if the decrypted token comprises a higher number of information bits, the storage of written documents may be prohibited.

Figure 2B:
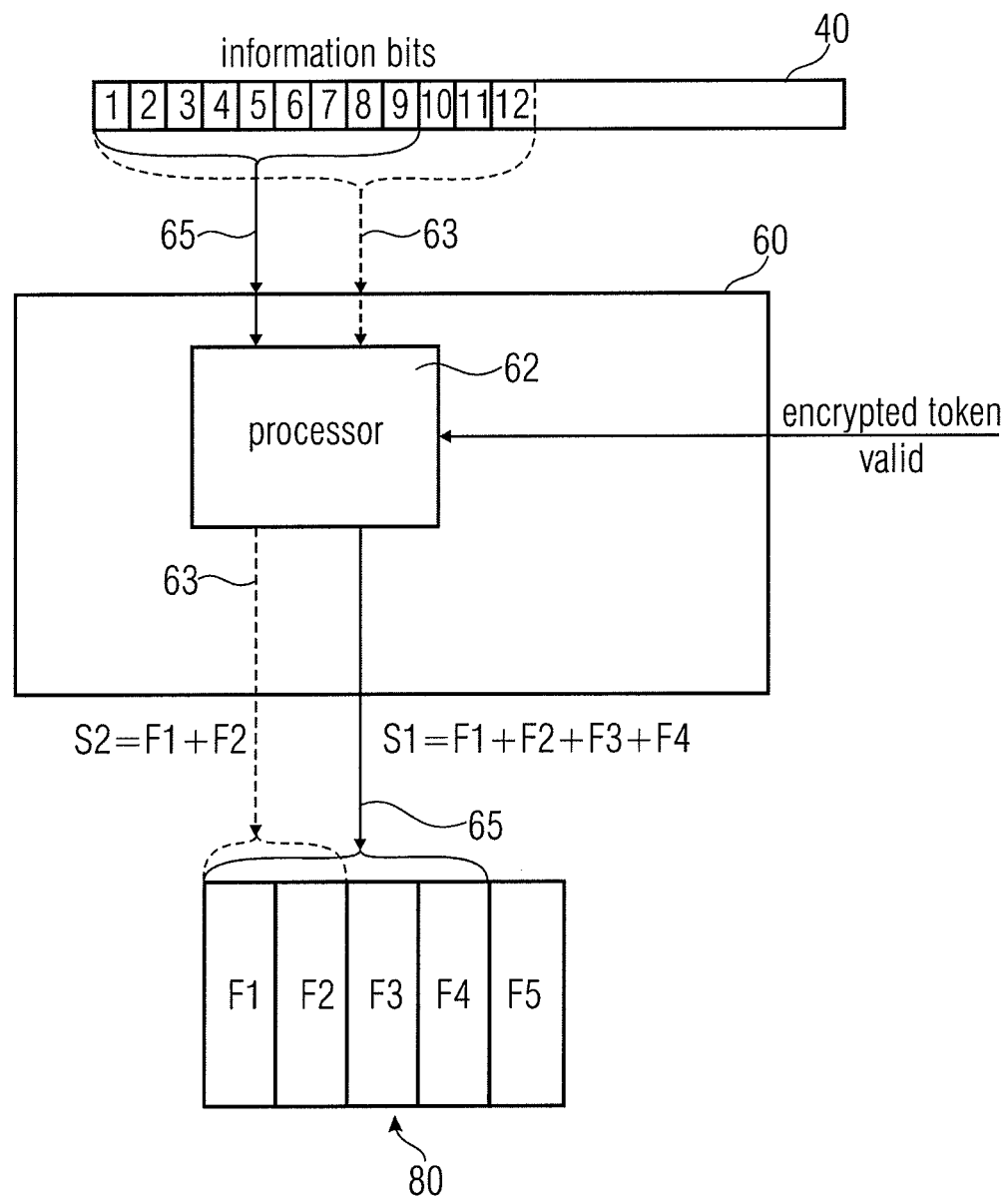
FIG. 2b shows a block diagram of a product access processor being part of the apparatus for verifying a validity of an encryptor token according to another embodiment.

In FIG. 2b, such a product access processor 60 is schematically depicted. According to this embodiment, the product access processor 60 may comprise a processor 62, wherein the processor 62 may determine or grant a level of product access depending on the number of information bits and depending whether the encrypted token has been verified to be valid by the evaluator 50. As schematically shown, a product 80 may comprise different features or functionalities F1 to F5. Such a feature or functionality for a software product may be, as already described above, for example, the possibility to burn a Blu-Ray disc, to read a Blue Ray disc, to store information, etc. In a first case 65, the decrypted token 40 comprises nine information bits (bit 1 to 9). These information bits together with the information from the evaluator 50 that the encrypted token 10 is valid, are processed by the processor 62 so that a user is allowed to access a first subset S1, which includes the functionalities F1, F2, F3 and F4 of the software product 80. In a second case 63, the product access processor 60 is configured to allow a user, based on a comparatively higher number of information bits (bits 1 to 12) a lower level of product access. In the second case 63, the processor 62 may be configured to allow a user, based on the twelve information bits 1 to 12 and the information concerning the validity of the encrypted token, the usage of a second subset S2 for a user. The second subset S2 may comprise a lower level of product access, for example, only the functions F1 and F2 of the software product 80.

Figure 3:
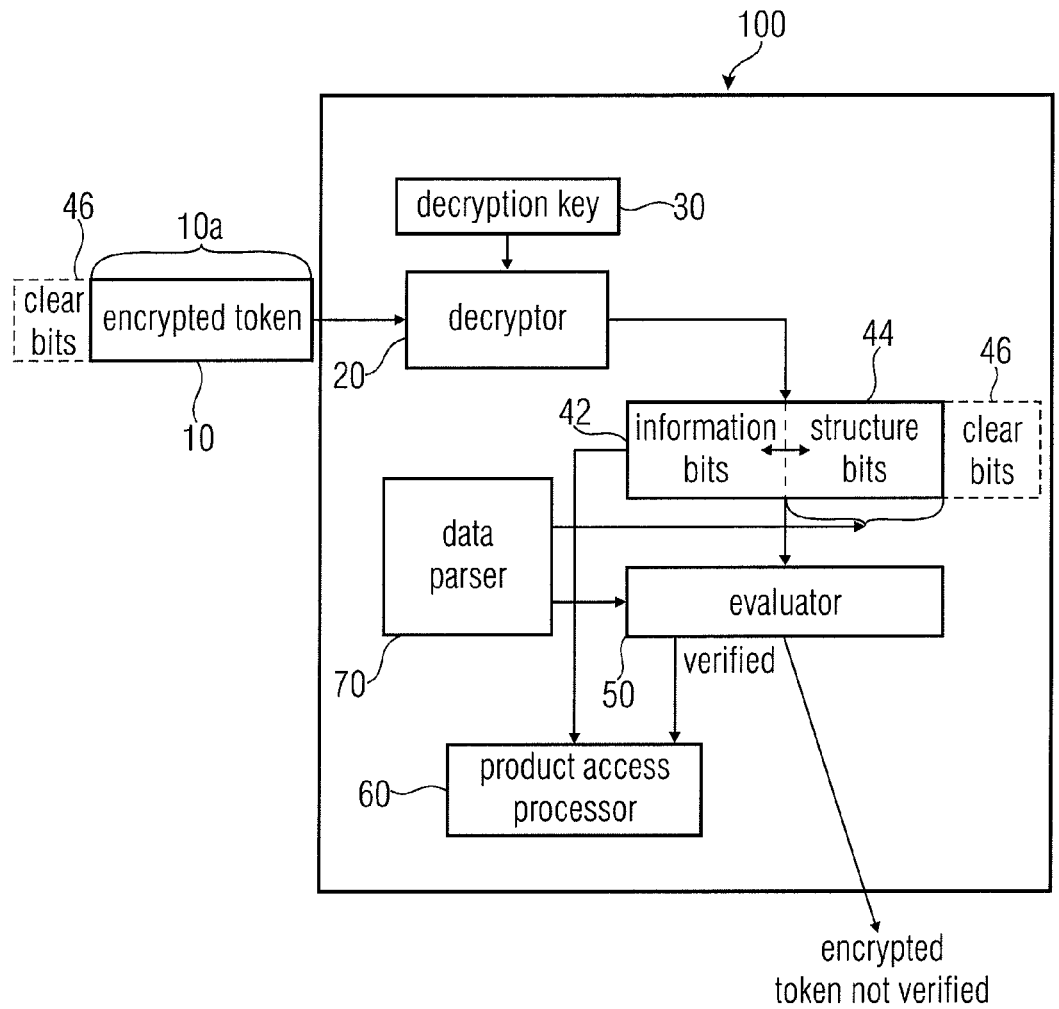
FIG. 3 shows a block diagram of an apparatus for verifying a validity of an encrypted token associated to a product additionally comprising a data parser according to another embodiment of the invention.

A further embodiment of an apparatus 100 for verifying a validity of an encrypted token 10 associated to a product is shown in FIG. 3. In this embodiment, the apparatus 100 comprises a data parser 70 for parsing the decrypted token 40. Thereby, the data parser 70 is configured to determine a variable number of structure bits 44 depending on at least a portion of the decrypted token. In addition, the data parser 70 is configured to identify the structure bits in the decrypted token 40 for the evaluator 50. Then the evaluator tries to evaluate the structure bits based on the identified structure bits.

According to some embodiments, the encrypted token 10 with the encrypted section 10a may additionally comprise a clear bit section 46. The clear bit section 46 can comprise information on the product, which is not related to a level of product access. Such information may, for example, be a product version number, e.g., a software-release number or a production date. According to these embodiments, the decryptor 20 is configured to only decrypt the encrypted section 10a of the encrypted token 10. This means that the decryptor does not decrypt the clear bit section 46 with the clear bits.

Accordingly, a data parser 70 may be configured for parsing the decrypted token 40 or a clear bit section 46 attached to the encrypted token 10. Furthermore, the data parser may then be configured for determining a variable number of structure bits 44 depending on at least a portion of the decrypted token 40 or the clear data portion 46. The data parser 70 is configured to identify the structure bits in the decrypted token 40 and provide the structure bits or information regarding the structure bits 44 to the evaluator 50. In other words, the data parser identifies the structure bits within the decrypted token. These structure bits are fed to the evaluator so that the evaluator 50 can check whether the structure bits fulfill the above-mentioned predetermined condition. In this embodiment, the decrypted token may additionally comprise the unchanged clear bits 46, i.e., the clear bits in the plain—or decrypted token and in the encrypted token are identical. Information which is stored in the clear bits is visible for a user. By contrast, the information of the information bits in the encrypted token is concealed from a user.

Figure 4:
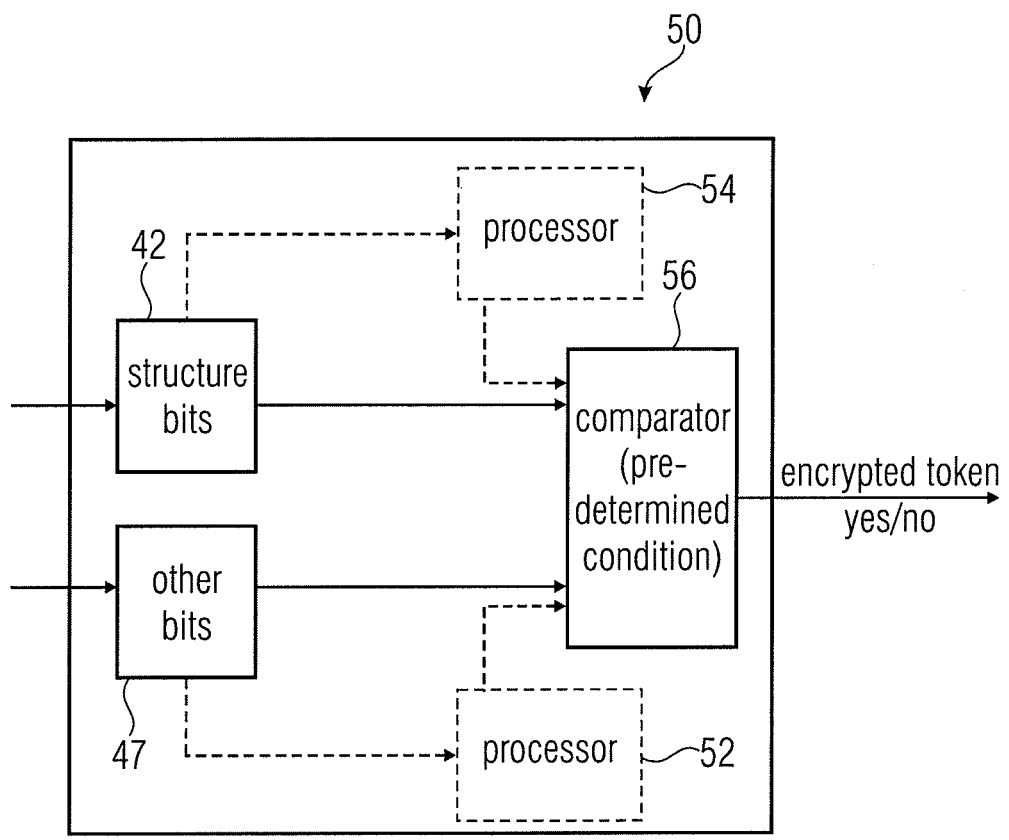
FIG. 4 shows a block diagram of an evaluator being part of the apparatus for verifying a validity of an encrypted token according to an embodiment.

In FIG. 4, a block diagram of an evaluator 50 for evaluating whether the structure bits 44 fulfill a predetermined condition is shown. According to this embodiment, the evaluator 50 comprises a comparator 56, which compares a predetermined bit combination which represents the predetermined condition, with the structure bits 44 from the decrypted token 40. In another embodiment, the comparator 56 compares the structure bits 44 and other bits 47 of the decrypted token 40. As it is schematically shown by the dashed block diagrams 54 and 52, respectively, the evaluator 50 may comprise at least one processor, which is configured to derive a value from the structure bits 44 or other bits 47 included in the decrypted token 40, which is then compared with a predetermined condition in the comparator 46. In another embodiment the evaluator 50 may be configured to compare a value or a bit structure derived from the other bits 47 in the comparator 56 with a predetermined bit structure or a predetermined condition in order to distinguish whether the encrypted token 10 is valid or not. This means that the evaluator 50 outputs information concerning the validity of the encrypted token.

As described above, the evaluator 50 may be configured to compare a variable number of structure bits 44 or other bits 47. The structure bits in the decrypted token may be identified by the data parser 70 as described in context to FIG. 3. The evaluator may be configured to compare the structure bits and/or other bits of the decrypted token with the predetermined condition, for example, by means of a comparator. The result of the comparison may indicate whether a validity of the encrypted token is verified.

According to the embodiment of the software product, the evaluator 50 verifies whether the serial number typed in by a user is a valid serial number or an invalid serial number. In embodiments of the invention, the evaluator may be configured to use a variable number of bits to evaluate whether the structure bits fulfill a predetermined condition—"yes" or "no". During the evaluation the evaluator may use a higher number of structure bits when the number of information bits in the decrypted token 40 is lower or it may use a lower number of structure bits in the evaluation when the number of information bits 42 is comparatively higher. This means, for example, if the number of information bits and structure bits is constant, a evaluator 50 may be configured to evaluate a higher number of structure bits if the number of information bits is reduced and vice-versa.

Figure 5:
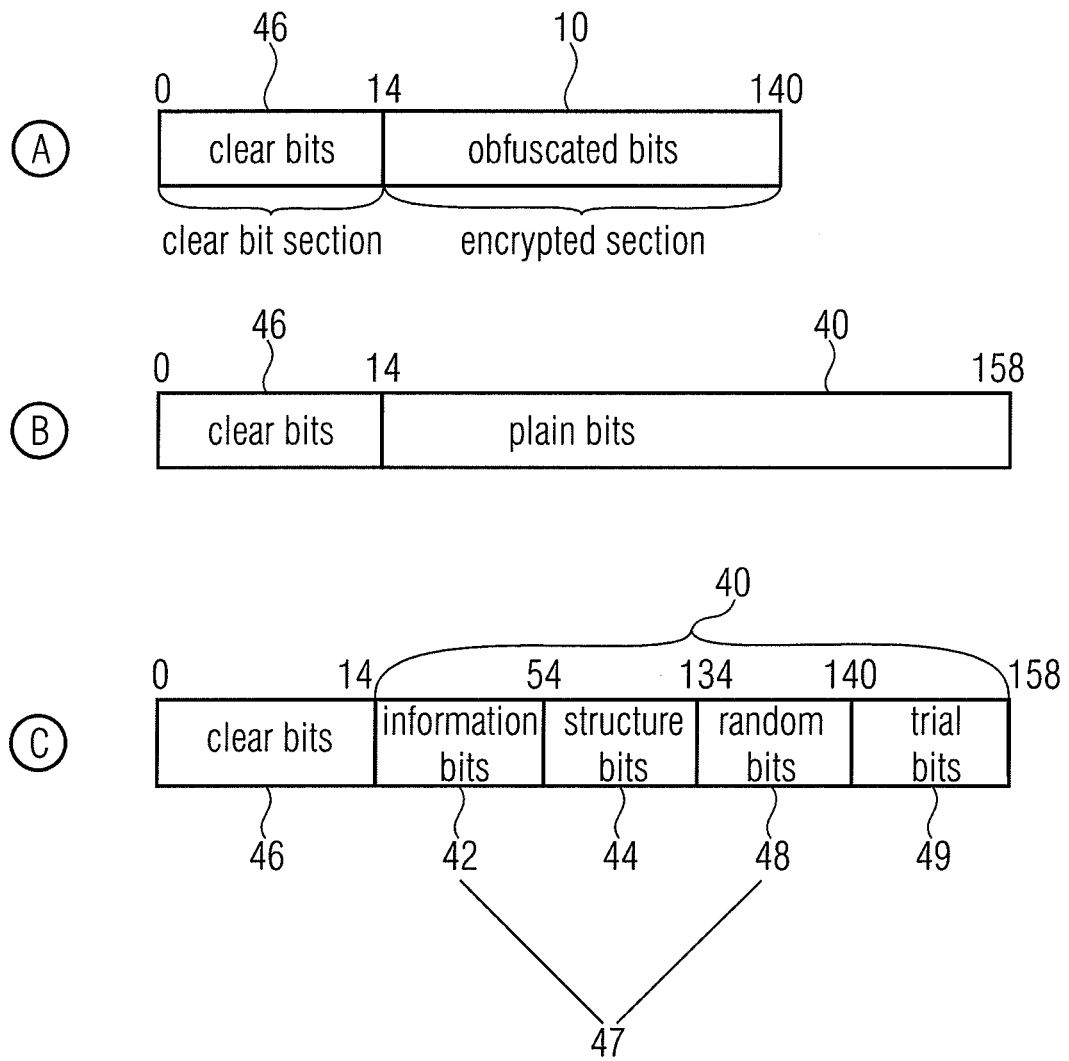
FIG. 5 shows a schematic block diagram of an encrypted token and a decrypted token.

Referring to FIG. 4, the other bits 47 of the decrypted token 40 can be the information bits 42. Then, the evaluator 50 is configured to use at least a portion of the information bits 42 to verify a validity of the encrypted token 10. As already described in context to FIG. 3, the encrypted token 10 may comprise a clear bit section with the clear bits 46. In this case, the decryptor 20 is configured to not decrypt the clear bits 46 and to use at least a portion of these clear bits 46 for evaluating whether a predetermined condition is fulfilled. The encrypted token 10 in the decrypted token 40 can comprise different bit sections. In FIG. 5, for the purpose of illustration, the composition of such an encrypted token and the encrypted token is exemplarily explained. As it is schematically shown in FIG. 5 section A, an encrypted token 10 may comprise obfuscated bits, for example, 126 obfuscated bits in an encrypted section. In addition, the encrypted token may comprise a clear bit section 46 with, for example, 14 clear bits. According to embodiments, a user may not be able to understand the meaning of the obfuscated bits, but the user can understand the meaning of the clear bits in the clear bit section of the encrypted token 10. In some embodiments, the encrypted token 10 may comprise a clear bit section 46, but in other embodiments, it does not comprise a clear bit section and all of the bits are obfuscated bits in the encrypted section. The decryptor 20 decrypts the encrypted token by means of a decryption key in order to obtain a decrypted token 40. As it is schematically shown in FIG. 5 in section B, the decrypted token 40 may comprise more bits, for example, 158 bits compared to the encrypted token 10, which comprises in this example only 140 bits. This number may, again, include the 14 clear bits of the clear bit section 46. Therein, the decrypted token 40 may also be named plain token 40. In this embodiment, apart from the 14 clear bits, the plain token 40 comprises 144 plain bits. The decryptor 20 is configured to decode or encrypt by means of a validation algorithm using a public key the 126 obfuscated bits in the encrypted token 10. If the decryptor uses, for example, the Niederreiter algorithm with the parameter m=16 and t=9 as described later therein, the decrypted token 40 comprises 144 plain bits. This means, that the bit length or the number of bits of the encrypted token can be enlarged during the encoding with the public key. The plain bits may include information concerning, for example, access rights to certain features of a product. These information in the plain bits are visible for a user, but in contrast, this information is not visible—this means encrypted—for a user in the obfuscated bits.

According to the terminology used herein, the encrypted token is encrypted with the secret key and, as will be described below, decrypted with a public key of a cryptosystem. This terminology may differ to a standard terminology which may make use of the terms public-key encryption and secret-key decryption.

In the embodiment in FIG. 5 section C, the 144 plain bits exemplarily consist of 40 information bits 42, 80 structure bits 44, 6 random bits 48 and 18 trial bits 49. The decrypted token 40 may furthermore comprise the above-mentioned 14 clear bits 46. An evaluator 50 may now be configured to execute a validation algorithm in order to verify whether the structure bits 44 comprise the needed structure. This means, that the structure bits fulfill the predetermined condition. If the 80 structure bits 44 fulfill this predetermined condition, the encrypted token, e.g. the serial number is valid. A predetermined condition is, for example, that the first 14 bits of the structure bits 44 are a copy of the clear bits 46 and that the remaining bits of the structure bits 44 comprise a "1". Information, which is included in the clear bits, can be directly read by a user from the serial number. Information, which is contained in the information bits are concealed from a user if he tries to read his encrypted serial number. The structure bits 44 determine whether a decrypted token is valid or not.

The random bits 48 and the trial bits 49 serve to find a user specific token, which is encryptable with a private key. According to some embodiments, the plain token comprises random bits and trial bits. The difference between the random bits 48 and the trial bits 49 will be explained with the help of an example. If a plain token comprises, for example, 60 bits and the corresponding encrypted token 50 bits, then there are 60−50=10 trial bits available. The plain token with the bit length 60 cannot comprise more than 50 bit information, since the plain token can be unambiguously calculated from the encrypted token with 50 bits. The 10 trial bits can be used to find an encryptable plain token without reducing the number of possible information bits. In contrast, the random bits, which are also used to find an encryptable plain token, are taken from the possible information bits. That means that the random bits reduce the number of information bits and the trial bits do not reduce the number of information bits in a plain token.

The random bits 48 and the trial bits 49 may be used to find a plain token, which can be encrypted with an encryption key, e.g. a private key of a Niederreiter-algorithm. Details for the encrypting of a plain token will be discussed later therein, but it should be noted that according to another embodiment of the invention, the apparatus 100 may comprise an evaluator 50, which is configured to use at least a portion of the random bits 48 of the decrypted token 40 for evaluating the validity of the encrypted token 10. This means that referring to FIG. 4, the other bits 47 may comprise beside information bits 42 random bits 48. It should be noted that the number of bits shown in FIG. 5 is for the purpose of illustration only, and in other embodiments the number of clear bits, information bits, structure bits, random bits or trial bits can be different.

According to another embodiment, a decryptor 20 of an apparatus 100 is configured to decrypt an encrypted token 10 using a decryption key to obtain a decrypted token 40 in which the decrypted token 40 comprises less than or equal to 200 bits. In this embodiment the number of information bits is less than or equal to 100 bits and the number of the structure bits of the decrypted token is less than or equal to 100 bits. According to this embodiment, the decryptor 20 is configured for performing a decryption having block lengths equal to or less than 200 bits and in which the evaluator 50 is configured for performing an operation of comparison with a predetermined condition using a number width of equal to or less than 100 bits.

Figure 6:
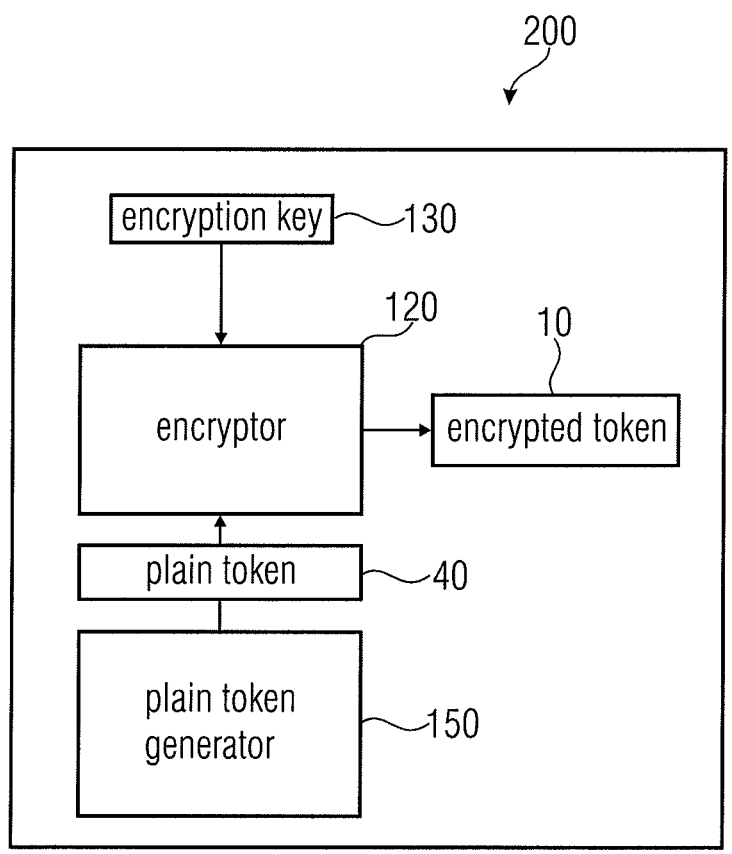
FIG. 6 shows a block diagram of an apparatus for generating an encrypted token associated to a product according to an embodiment.

In FIG. 6, an apparatus 200 for generating an encrypted token 10 associated to a product is depicted. The apparatus 200 comprises a plain token generator 150 for generating a plain token 40, wherein the plain token generator 150 is configured to generate a plain token 40 having information bits related to the product. Furthermore, the plain token generator 150 is configured to generate a plain token 40 having structure bits related to a predetermined condition for verifying a validity of the encrypted token 10. The plain token generator may be configured to generate structure bits 44, which fulfill a predetermined condition. The apparatus 200 may furthermore comprise an encryptor 120 for encrypting the plain token 40 using an encryption key 130 in order to obtain an encrypted token 10. The encryptor 120 may be configured to perform an encryption of a plain token 40 using a public key cryptographic method. Such a cryptographic method may, for example, be the Niederreiter method, but also other public/private key methods, like the RSA-algorithm or the McEliece algorithm etc may be used. According to some embodiments, the encryption key 130, which is used by the encryptor 120 to generate an encrypted token, may, for example, be a private key. This means, that the encryption of the plain token is performed, following the terminology therein, with a private key or secret key, according to some embodiments. The private key is not accessible by the public but the public is. The encryptor 120 may be configured to generate an encrypted token 10 having fewer bits than the plain token 40. According to some embodiments, this may be possible by the usage of mapping bits, for example, the random bits 48 and/or the trial bits 49. For that, the encryptor 120 may be configured to apply a certain encryption algorithm, for example, the Niederreiter algorithm. For encrypting the plain token, the encryptor may perform any public/private key method in order to obtain an encrypted token. For the purpose of illustration, in the following, the Niederreiter cryptosystem will be explained in more detail.

A bit vector, which comprises a length n with a weight % is a bit vector that contains n bits, wherein exactly t bits comprise the value "1" and n-t bits the value "0", for example, comprises the bit vector 0110 0101 1011, the length 12 and a weight 7.

A Niederreiter cryptosystem is now considered with the parameter m=16 and t=9. In order to encrypt a message m with a public key, first the message m is represented as a bit vector of the length n with:

$$n:=2^m=65536 \qquad (1)$$

and the weight t=9. There are $\binom{n}{t}$ different bit vectors of the length n with the weight t. This means for n=65536 and t=9:

$$B:=\binom{n}{t}=n!/(t!(n-t)!)\sim 2^{125.530} \qquad (2)$$

Different messages can be encrypted with the encryption key (public key or private key depending on the terminology). As a result, an encrypted message is obtained with m×t=144 bits. By means of the Niederreiter method, the bit length of the operands can be changed. For m=16 and t=9, one obtains in an encryption of a message with 126 bits by means of a public key an encrypted message with 144 bits. During the decryption or during the decoding of the encrypted message with 144 bits by means of a secret key a corresponding decrypted message with 126 bits is calculated. Since more messages with a bit length of 144 bits exist than messages with a bit length of 126 bits, and the public key encryption is an injective operation, not every message with a bit length of 144 bits can be encrypted by means of the public key. Is v a randomly-chosen message with a bit length of 144 bits, then the probability p that v can be encrypted with the public key is:

$$p=B/2^{144}\sim 2,75 \cdot 10^{-6} \qquad (3)$$

wherein B is the above-defined number of bit vectors with the length n and the weight %.

It should be noted that concerning this example for the Niederreiter method and usual also for other public key methods, a plain message is encrypted with a public key and a encrypted message is decrypted with a secret key. In contrast, as already explained above according to some embodiments of the invention for the encryption of a serial number a public key is used to decrypt the encrypted serial number and a private key or a secret key is used to encrypt the decrypted serial number. This means, in the following, a terminology with respect to some embodiments of the invention is chosen so that the decryption is performed with a public key and the encryption is performed with a secret key.

Figure 7:
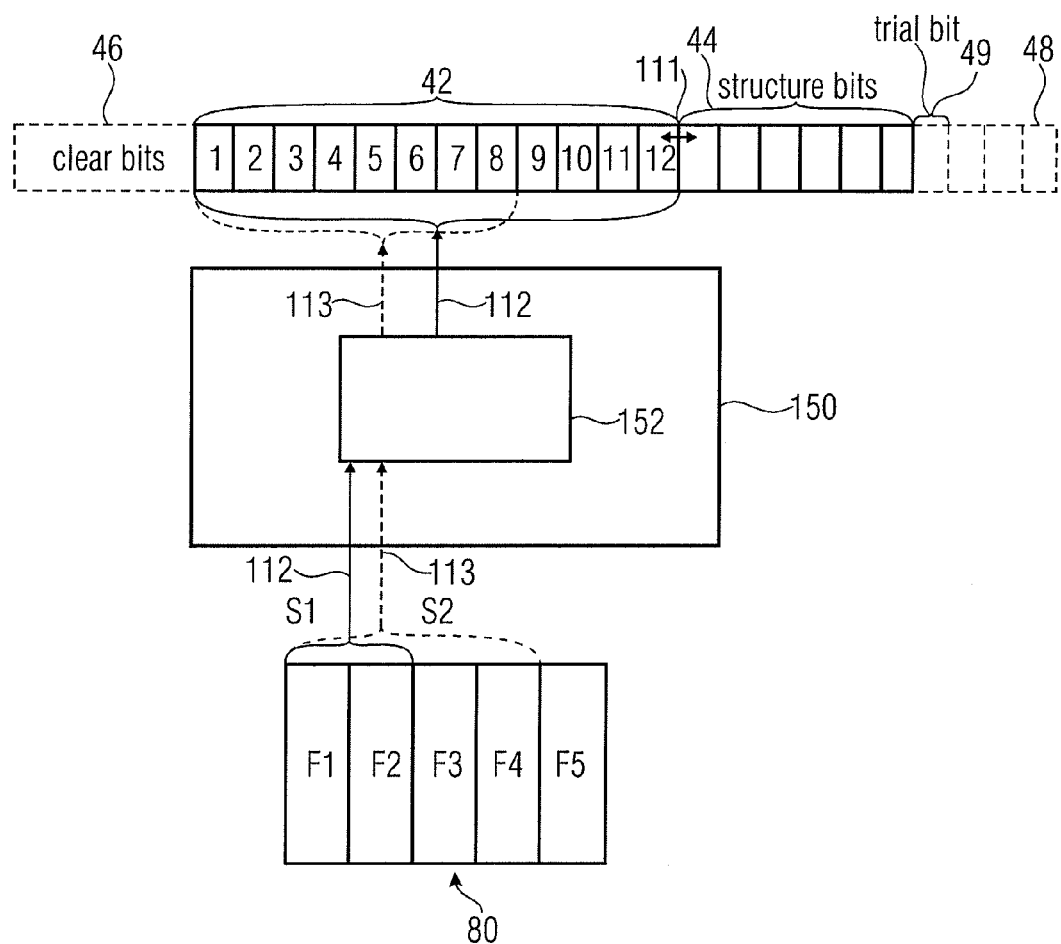
FIG. 7 shows a block diagram of a plain token generator being part of the apparatus for generating an encrypted token according to another embodiment of the invention.

As shown in FIG. 7, the plain token generator 150 may comprise a processor 152, which is configured to determine a higher number of information bits 42 when a first subset S1 of functions of a product having less, less expensive or less complicated functions to be usable by a user is generated and to determine a lower number of information bits when a second subset S2 of functions of a product having more, more expensive or more complicated functions to be usable by a user is generated. In FIG. 7, the plain token generator 150 with its processor 152 may generate exemplarily a plain token for a first subset S1, which includes only the functionalities F1 and F2 of the product 80. Compared to a second subset S2, which includes the functionalities F1 to F4 of the product 80, the subset S1 comprises therewith less functions of the product. In other embodiments, the first subset may comprise less expensive or also less complicated functions. In this embodiment, depending on the number of functions, which shall be accessible with the generated encrypted token, the plain token generator 150 generates a plain token 40.

For the second subset S2 of functions, which includes more functions compared to the subset S1, the processor 152 may generate a plain token 40 comprising only 8 information bits. This means the plain token generator 150 may be configured to determine depending, for example, on the number of the retail price of the product or the complexity of the functions of the product, which shall be accessible by the encrypted token, the number of information bits within the plain token 40. In some embodiments, the apparatus 200 comprises a plain token generator 150, which is configured for determining a number of structure bits based on an intended retail price of the product, wherein the plain token generator 150 is configured to generate a higher number of structure bits for a higher retail price and a comparatively lower number of structure bits for a comparatively lower retail price. As it is schematically shown in FIG. 7, the plain token generator 150 may also be configured to generate a plain token, which additionally comprises a clear bit section 46 and a section 40 to be encrypted. The clear bit section may comprise information on the product, wherein the information is not related to a level of product access, as described above. The information bits 42 of the section 40 to be encrypted may be related to the level of product access. According to this embodiment, the encryptor 120 is configured for only encrypting the section 40 to be encrypted and to not encrypt the clear bit section 46. This means that the final encrypted token comprises an encrypted section and a clear bit section 46, which can be read by a user.

Referring to the example with the software product, the generated encrypted token may be a serial number, which is sold together with the software product to a customer or user. This serial number may comprise a clear bit section so that a user can understand and read this section being part of the serial number and which may be related to the software product. In some embodiments of the invention, the plain token generator 150 may furthermore be configured for generating at least one trial bit 49 in addition to the information bits 42 and the structure bits 44, wherein the structure bits do not depend on a bit value of the at least one trial bits 49. In this case, the encryptor 120 can be configured for performing an encryption operation of the plain token 40, which results in a number of bits of the encrypted token 10, which is smaller than a number of bits of the plain token 40. The encryptor 120 may be configured to determine whether an encrypted token 10 exists for a first value of the at least one structure bit and to determine whether an encrypted token exists for a second value of the at least one trial bit when an encrypted token does not exist for the first value of the at least one trial bit. Since, for certain cryptosystems the number of bits of the encrypted token is smaller than the number of bits of the plain token, not every plain token can be encrypted. For the encryption, a certain cryptosystem algorithm may be used, for example, the Niederreiter algorithm. Therefore, the encryptor may be configured to accurately test or check if an encrypted token according to the encryption algorithm exists for a first bit structure or bit combination of the structure bits in the plain token 40. If according to the encrypting algorithm an encrypted token exists, the encrypted token is generated and if an encrypted token does not exist for the chosen bit structure of the structure bits, a second bit structure or value of the at least one structure bit is proven. This is repeated until an encrypted token is generated. By means of the trial bits and additional random bits, also named herein mapping bits, which may also be part of the plain token 40, the probability to find an encrypted token, for example, using a Niederreiter algorithm, may be $r \sim 1-8.55 \times 10^{-21}$. This means that the probability is almost 1.

In the following, an embodiment of a generation algorithm, which is performed by an encryptor 120 of the apparatus 200 for encrypting a plain token using an encryption key 130 to obtain an encrypted token 10, is illustrated more detailed. For the purpose of illustration only, this will be described again by means of a Niederreiter algorithm for encrypting a decrypted serial number, which represents the plain token 10.

In general, the apparatus 200 and the respective method for generating an encrypted token can be performed with other encryption algorithms and for other products than software products or technical systems.

Referring to FIG. 5 section C, a plain token 40 may comprise structure bits 44. In general, the generation of an encrypted token should be performed so that a user of a valid encrypted token cannot or hardly determine a further value encrypted token. Furthermore, if a user succeeds to discover or hack the evaluation algorithm and the respective decryption key, it should be impossible for the user to determine from the evaluation algorithm and the respective decryption key the generation algorithm for other valid encrypted tokens.

This means that a user, for example, with a valid serial number for a software product, should not be able to determine a further different valid serial number for the software product. Furthermore, a user who discovers the validation algorithm on the software product should not be able to determine the generation algorithm from the algorithm and the respective applied decryption key. An evaluation algorithm, which is performed by an evaluator, may be implemented in the application, for example, the software product, which is used by a user. It might be possible that a software pirate or hacker determines the evaluation algorithm by reverse engineering. This should be prevented and therefore the encrypted token may be encrypted so that the change of just one bit of the encrypted token results in a change of more and other bits of the plain token during the decryption process. The generation algorithm for an encrypted token is not delivered together with the product and is not accessible by a user. Therefore, a user does normally not know the generation algorithm for encrypting a plain token and which is performed by the encryptor 120.

According to some embodiments, the structure bits 44 of the plain token, e.g. the decrypted serial number, may be related to a level of security of the product and may be chosen to prevent a encrypted serial number to be hacked. During a so-called Brute-force attack, a user tries randomly chosen serial numbers until a serial number is accepted by the application, e.g. the software product, to be valid. If a plain token or decrypted serial number comprises S structure bits, only a single serial number of $2^S$ randomly chosen serial numbers is valid. This means only one combination among the $2^S$ possible values of the structure bits deliver a valid serial number. For S=80 structure bits, so many trials in a Brute-force attack are needed, so that a Brute-force attack will not be successful statistically with present and future computing speed of computer systems. If a bit combination cannot be hacked with present and future computers, it is called cryptographically secure.

As shown in FIG. 5 sections A, B, C an encrypted serial number 10 may comprise 140 bits, including 14 clear bits 46. The decrypted serial number 40 may comprise 158 bits including 14 clear bits and 80 structure bits. Since the encrypted serial number comprises 140 bits and 14 bits are needed as clear bits and 80 bits are used as structure bits, a maximum number of 140−14−80=46 bits is left as information bits.

The decrypted serial number comprises 158 bits including 14 clear bits, 80 structure bits and 46 information bits. Therefore, 18 bits remain as trial bits (158−14−80−46=18), wherein the object of the trail bits is explained later. By means of the Niederreiter encryption with a private key, a message with 144 bits is transformed in a message with 126 bits according to some embodiments therein. The encryptor 120 of the apparatus 200 may be configured to perform this transformation using a Niederreiter encryption algorithm. As a consequence of the reduced number of bits of the encrypted token, e.g. of the encrypted serial number, not every message with a bit length of 144 bits can be encrypted by means of a private key. Therefore, the above-mentioned trial bits 49 are used for the encryption. The above-mentioned 18 trial bits can have $2^{18}$ different bit combinations or values. As a consequence, $2^{18}$ different decrypted serial numbers are available for a given number of clear bits, information bits and structure bits.

According to some embodiments, the encryptor 120 can be configured to test or check if a decrypted serial number (plain token) among these $2^{18}$ bit combinations can be encrypted by means of a private key. As already mentioned above, the encryptor 120 may be configured to apply the Niederreiter encryption by means of a private key only on the information bits, structure bits and trial bits. The Niederreiter encryption is not applied to the clear bits. The probability p that one decrypted serial number or plain token can be encrypted by means of the encryption key 130, e.g. the private key, is:

$$p \sim 2.75 \times 10^{-6} \quad (4)$$

(see also formula 3). This means, that the probability to be able to generate an encrypted serial number from a decrypted serial number by means of the private key is very low. The probability q increases if the 18 trial bits are additionally used to encrypt the decrypted serial number:

$$q \sim 1 - (1-p)^G \quad (5)$$

with $G = 2^{18}$, this means:

$$q \sim 0.514 \quad (6)$$

In other words, with this generation algorithm, only one of two decrypted serial numbers can be statistically encrypted.

However, the encryptor 120 should be configured to encrypt normally every plain token or decrypted serial number by means of the used encryption or generation algorithm. Therefore according to some embodiments of the invention 6 bits from the 46 information bits do not comprise any information related to the product. These 6 bits are used as random bits 48, which are schematically shown in the plain token in FIG. 5 section C. These random bits 48 are used to increase the number of possible bit combinations to encrypt a decrypted serial number. These increased number of bit combinations are then tested by the encryptor 120 whether they can be encrypted by means of the private key or not.

If, for example, 6 further random bits are used, the probability for a successful encryption by means of the encryptor 120 applying an algorithm of a Niederreiter cryptosystem with m=16 and t=9 is increased to:

$$r \sim 1 - (1-p)^H \quad (7)$$

with $H = 2^{24}$. This means:

$$r \sim 1 - 8.551 \times 10^{-21} \quad (8)$$

This means that the probability that the encryptor 120 can perform an encryption of the plain token is 1 or almost 1. In other words, if a certain number of information bits is not used for carrying information, but for providing additional sufficient bit combinations, which are checked by the encryptor whether the plain token can be encrypted with the private key, every plain token or almost every plain token can be encrypted by the encryptor 120.

Every decrypted serial number, which is generated or determined by the plain token generator 150, can, according to some embodiments, be encrypted by the encryptor 120 so that an encrypted serial number can be generated to each decrypted serial number, an encrypted serial number can be generated. This encrypted serial number can then be sold together with a software product to a customer or user. According to other embodiments of the invention, the apparatus 200 may be configured to generate encrypted tokens 10 with a different security level. This means that the apparatus 200 may be configured to provide encrypted tokens 10 with a scalable security.

As described above, the structure bits may comprise 80 bits. These 80 bits ensure a cryptographic security for the encrypted token 10. Since the "normal user" neither has a supercomputer nor special cryptographic hardware, 64 structure bits as security for a Brute force attack from a private user may be sufficient. The 16 spare bits can then be used as additional information bits so that 40+16=56 information bits are available to carry information. According to an embodiment, an encrypted serial number may comprise 140 bits including 14 clear bits. For such an encrypted serial number, two levels of security may be available. For professional users, an encrypted token, e.g. an encrypted serial number may comprise 40+14=54 bits for information and with a high cryptographic security. For private users, the security level may be lower and, hence, the number of information bits may be higher, for example, 56+14=70 bits. This means for a given number of plain token bits the number of structure bits 44 and information bits 42 can vary depending on a desired level of security, as schematically depicted by the arrow 111 in FIG. 7. If the number of structure bits is increased the number of information bits in the plain token may be reduced and vice versa.

Therefore, according to some embodiments of the invention, the encrypted token or the encrypted serial number can be adapted to a desired security level depending on the user or on the product. With a given number of bits of a plain token and a given payload, all bits that are not required for encoding the payload can be used for increasing the level of security of the encoded token. The apparatus 200 can be configured so that the generated encrypted token, which is associated to a product, can comprise a tailored security level. According to an embodiment, a high level of security may be given if the encrypted token comprises 140 bits including 14 clear bits and 126 obfuscated bits. The corresponding plain token may comprise 158 bits with 14 clear bits, 40 information bits 80 structure bits, 6 random bits and 18 trial bits. For a lower level of security, which may be sufficient for a private user, the encrypted token may comprise 140 bits with 14 clear bits and 120 obfuscated bits. The corresponding plain token may comprise 158 bits with 14 clear bits, 60 information bits, 60 structure bits, 6 random bits and 18 trial bits. According to a further embodiments of the invention, bit length of a encrypted token predetermined and the number of information bits and structure bits is constant. This means that the more structure bits used, the higher the level of security is, but as a consequence, less information bits are available for information related to the product.

In FIG. 8, a further embodiment of the invention related to an apparatus 200 and the method for generating an encrypted token associated to a product is illustrated. In this embodiment, an encrypted serial number for a software product is generated. The plain user specific token 40 comprises in this example 4 clear bits 46, 10 information bits 42, 6 structure bits 44, 2 random bits 48 and 2 trial bits 49. The plain token generator 150 (see FIG. 6) may be configured to generate the above-mentioned decrypted serial number. The 4 clear bits 46 may contain, for example, a software version number, e.g. version 7, which is indicated to a user as binary number (see row 2). In this example, the first bit of the information bits 42 indicates whether a user can play a Blu-Ray disc or not. The second bit of the information bits 42 determines whether a user may burn a Blu-Ray disc. Hence, in the example shown in row 3, a user may play a Blu-Ray disc, but he is not able to burn a Blue Ray disc. Furthermore the software product may comprise an ID, for example, an ID 32. The respective bit combination is created by the plain token generator and is written on the remaining information bits, as it is shown in row 4 of FIG. 8. The structure bits 44 determine whether a plain user specific token is valid if the decrypted token is checked later on by the evaluator 50. As described above, the structure bits 44 may comprise a bit structure, which is verified by the evaluator later on and compared to the predetermined condition. In this example, the plain user specific token may be valid if the structure bits comprise a copy of the clear bits 46 and a copy of the random bits 48. This means that the structure bits may comprise random bits, which are used later on in order to be able to encrypt the plain token, i.e. to find an encrypted token.

The plain user specific token may furthermore comprise a bit structure as depicted in row 5 of FIG. 8, wherein the random bits A,B are copied to the structure bits, wherein each of the bits A and B can be a "1" or a "0". Therefore the 2 trial bits 49 and the 2 random bits 48 can have 16 possible bit combinations. These 16 possible bit combinations for the trial and random bits are shown in the rows 6 to 21. Among these 16 possible values or plain tokens, one value or plain token is needed, which can be encrypted with an encryption key, for example, with a private key of a cryptosystem. A respective generation algorithm for generating an encrypted token may be based on a Niederreiter cryptosystem. Exemplarily the bit structure of the plain token in row 16 may be encryptable. In row 22, the result of the encryption by the encryptor 120 is exemplarily depicted.

According to this embodiment, the clear bits 46 are not encrypted and they are identical to the clear bits 46 of the plain token 40. The encrypted token 10 comprises together with the clear bits 46 a bit length of 22 bits, which is smaller compared to the bit length of 24 bits of the plain token 40 including the clear bits 46. According to this embodiment, the encrypted token 10 together with the clear bits 46 comprises a smaller number of bits than the corresponding plain token with clear bits. In other embodiments, the plain token 10 may comprise an identical number of bits than the corresponding encrypted token. In other embodiments, the encrypted token may comprise more bits than the corresponding plain token. The number of clear bits added to the plain token may be the same number of clear bits 46, which comprises the corresponding encrypted token.

A user of the software product can now enter the encrypted user specific token at his computer in order to work with the software product. The encrypted token 10, which is exemplarily depicted in row 22 in FIG. 8 as a binary number may be entered by a user as a numeral and letter code. This means that the binary number may be encoded so that a serial number comprises numerals and letters, for example, IKS3-K9U7-KL64-98JH.

Figure 9:
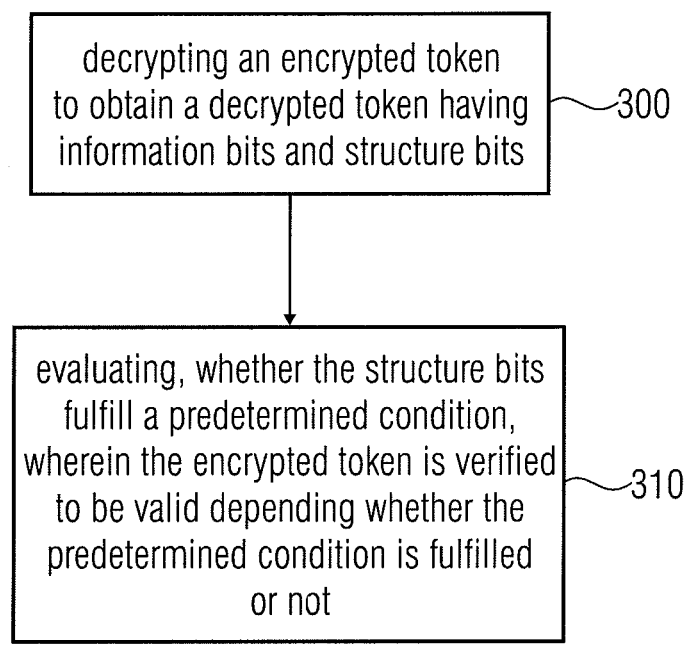
FIG. 9 shows a flow chart of the method for verifying a validity of an encrypted token associated to a product according to an embodiment.

In FIG. 9, an embodiment of a method for verifying a validity of an encrypted token associated to a product is shown in a flow chart.

According to this embodiment, the method may comprise a step of decrypting 300 an encrypted token to obtain a decrypted token having information bits and structure bits. The method further comprises a step of evaluating 310 whether the structure bits fulfill a predetermined condition, wherein the encrypted token is verified to be valid when the predetermined condition is fulfilled or is not verified to be valid when the predetermined condition is not fulfilled.

As described above, the step of decrypting may be performed by applying a public/private key cryptosystem algorithm to a encrypted token. The decrypting 300 may be performed by applying an public/private key method, e.g. a RSA-algorithm, a McEliece algorithm or a Niederreiter-algorithm to an encrypted token to obtain a decrypted token having information bits related to the product and structure bits.

The step of decrypting 300 an encrypted token may be performed so that the decrypted token comprises a larger number of bits than the encrypted token. The step of decrypting 300 may be performed so that a clear bit section of the encrypted token is not changed.

Evaluating 310 may be performed by comparing the structure bits with a predetermined bit structure of a predetermined condition. Furthermore the evaluating 310 may include to compare a variable number of bits of the decrypted token with a predetermined condition or predetermined bit structure. The number of structure bits may vary depending on a desired level of security for the encrypted token. Therefore the evaluating may be performed with a varying number of structure bits.

The step of evaluating 310 may be performed so that the structure bits or a value derived from the structure bits to other bits included in the decrypted token or a value derived from the other bits included in the decrypted token are compared with a predetermined bit structure of the predetermined condition.

According to another embodiment, the method for verifying a validity of an encrypted token may furthermore comprise a step of determining a level of product access in accordance with the information bits when the encrypted token is verified to be valid.

According to some embodiments the method for verifying a validity of an encrypted token associated to a product can be performed by a computer program. This means the inventive method can be a computer program having a program code for performing at least one of the inventive methods when the computer program runs on a computer.

It should be noted that in addition, some of the FIGS. 1 through 8 are illustrated as block diagrams of an apparatus. These Figs. simultaneously are illustrations of a method where the block functionalities correspond to the method steps.

Figure 10:
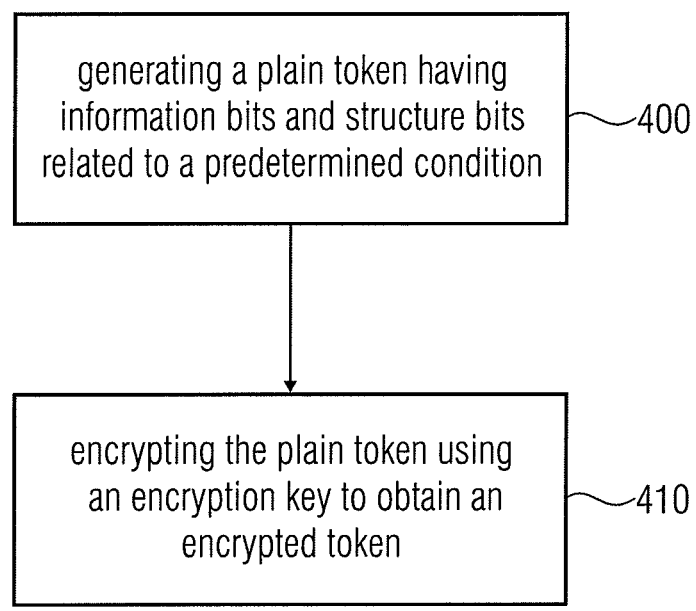
FIG. 10 shows a flow chart of the method for generating an encrypted token associated to a product according to an embodiment.

In FIG. 10, an embodiment of a flow chart of the method for generating an encrypted token associated to a product is depicted. The method comprises a step of generating 400 a plain token having information bits related to the product and having structure bits related to a predetermined condition for verifying a validity of the encrypted token, wherein the structure bits fulfill the predetermined condition. The method further comprises a step of encrypting 410 the plain token by a means of an encryption key to obtain an encrypted token.

According to some embodiments, the generation 400 of a plain token having information bits and structure bits related to a predetermined condition may be performed by means of a plain token generator as described therein and the encrypting 410 may be performed by a means of an encryptor 120 as described herein. The step of encrypting may be performed by the usage of a public/private cryptosystem in order to encrypt the plain token by means of an encryption key. The step of encrypting 410 may be performed using a private key of a public/private cryptosystem, for example, a private key of a RSA-algorithm, McEliece-algorithm or Niederreiter-algorithm. According to another aspect of the invention the encrypting 410 may be performed so that the encrypted token comprises a tailored level of security. The security level may depend, for example, on a retail price of the product which is accessible with the encrypted token.

The generation 400 of a plain token and the encrypting 410 may be performed so that the encrypted token comprises information concerning a product access. And as described above encrypting 410 may be performed so that an encrypted token comprises fewer bits than the plain token.

It should be noted that according to some embodiments also the method for generating an encrypted token associated to a product can be performed by a computer program. This means the inventive method can be a computer program having a program code for performing at least one of the inventive methods when the computer program runs on a computer.

Figure 11:
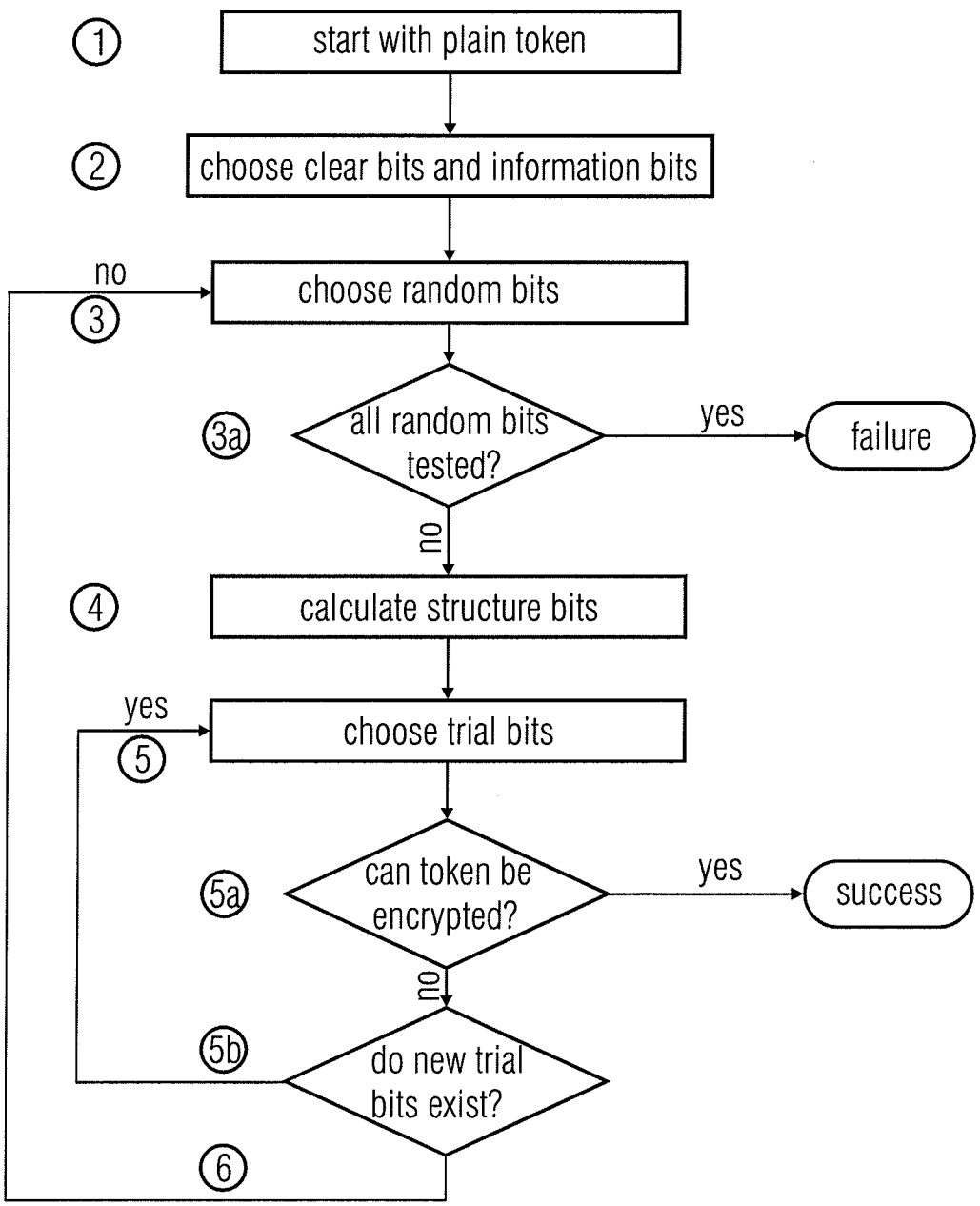
FIG. 11 shows a flow diagram of the method for generating an encrypted token according to another embodiment.

In FIG. 11, a flow chart of an embodiment of the method for generating an encrypted token associated to a product is depicted. In this embodiment, a plain user specific token is generated in a first step. The clear bits and the information bits of the plain user specific token are chosen and fixed in step 2. The clear bits can comprise, for example, information regarding a software version number and the information bits may comprise information regarding a product access, e.g. an access of certain product functionalities. Both clear and information bits contain information. However, information bits will be encrypted in the encrypted token and clear bits will not. Hence, the clear bits in the plain and in the encrypted token are identical and the user may be able to see the information that the clear bits contain. By contrast, the information of the information bits in an encrypted token is hidden to the user.

In step 3 in FIG. 11, random bits are chosen in order to increase the probability to be able to perform an encryption of the plain user specific token. By choosing the number of random bits large enough, the probability of failing to be able to generate an encrypted token is negligible. Depending on the number of random bits, which are taken, one can scale the probability of failure to encrypt a plain token. The probability of failing to encrypt a plain token may also be affected by the number of trial bits. If all random bits of a plain token have been tested, the generation method for generating an encrypted token may fail. This is schematically shown in step 3a. If all random bits of a plain token are tested and no success for encrypting the plain token is achieved by means of the encryption algorithm, a failure may occur. Otherwise, if not all of the random bits are tested, the structure bits are calculated in step 4 in FIG. 11. The structure bits are needed for the evaluation of the encrypted token. A user of an application, e.g. a software product enters the encrypted token to the application. The application decrypts the token, obtains the plain token or decrypted token and checks whether the encrypted token is genuine. For this check, the structure bits are used. Only for a specific combination of structure bits, the plain token passes the check. According to some embodiments, the structure bits can be a hash value, e.g. a hash value of the other bits of the plain token, but it is also possible that the structure bits are just a copy of the clear bits with some additional fixed pattern bits or other bit combinations. The structure bits may depend on random bits being part of the decrypted token.

If a decryptor system is chosen such that the plain token consists of more bits than the encrypted token, an encrypted token does not exist for every plain token. For this reason, random bits are included in the plain token. They do not contain information, but increase the possibility or probability to find a corresponding encrypted token. For the Niederreiter cryptosystem (with parameters m=16 and t=9), 6 random bits are sufficient to make the probability of failure for the generation method relatively small. This means that with the method for generating an encrypted token, almost every plain token can be encrypted.

In step 5, 5a, 5b, for each trial bit combination in the plain token, it is tested whether a corresponding encrypted user specific token 10 can be encrypted. Any combination of trial bits should be tested. This means for K trial bits, the loop of step 5 in FIG. 11 will be executed $2^k$ times if the plain token cannot be encrypted.

When the application decrypts the encrypted token, a public key encryption of the cryptosystem can be used. Hence, in step 5 and step 6 in FIG. 11, a secret or private key of a cryptosystem to decrypt (in the sense of the cryptosystem) the plain token in order to obtain the encrypted token (encrypted in the sense of the user) is used. If the secret key decryption of the cryptosystem succeeds, this means that it can calculate a corresponding encrypted token 10, the generation method does terminate with success.

According to another embodiment, the public/secret key method is chosen such that the operands of the public key and the secret key have the same number of bits, then the generation method consists only of steps 1, 2 and 4. This means that the plain token may not comprise random bits or trial bits.

Embodiments of the invention pertain to the domain of public key cryptography and digital signatures. It is used to achieve a maximum level of security by utilizing unused bits of the payload of a user specific digitally signed token. Other embodiments further relate to a scenario where the total length of a secure user specific token is limited due to external influences or specific properties of the domain within which it is used. An application may decrypt the encrypted user specific token in order to obtain the plain user specific token or the decrypted token. According to embodiments, the public/secret key method can be used to encrypt a plain token or to decrypt an encrypted token. The public/secret key method can be used such that the plain user specific token contains more total bits than the secure user specific token. In embodiments, an apparatus for generating a user specific token or encrypted token with a scalable security is shown. The apparatus may perform an encryption of the plain token by means of algorithm related to a retail price, a number of functions or the complexity of a function of the product. In embodiments, the plain user specific token consists of clear bits, structure bits, information bits, random bits and trial bits. A secure user specific token or encrypted token may consist of clear bits and encrypted bits. In some embodiments, the difference of the bit-count between the plain and the encrypted user specific token can be equal to the number of trial bits. This means that the number of trial bits may depend on the difference of the bit-count of the plain token or decrypted token and the encrypted token. According to an embodiment the number of trial bits can be defined as the difference of the bit-count of the plain token or decrypted token and the encrypted token.

In embodiments, an apparatus 200 for generating an encrypted token may be configured to generate an encrypted token with scalable security. According to embodiments, the generation method has scalable security with different security levels against, for example, Brute force attacks, when a user tries randomly different encrypted tokens. Hence, if the number of structure bits in the plain token is chosen too small, for example, 16, the Brute force attack may succeed. At the present time, about 80 bits are sufficient to achieve a cryptographic security. The more number of structure bits chosen, the less number of information bits are available, and conversely.

According to embodiments, the parameters of a cryptosystem, which is used for decrypting an encrypted token and for encrypting a plain token, can be chosen more secure and less secure. The user does not usually want to enter a lot of characters, but this may mean that the bit size of the operands (tokens) of the cryptosystem has to be chosen relatively small. As a consequence, the used crypto algorithm may be less secure. The choice of the cryptosystem used for encrypting and decrypting influences the security of the generated encrypted token. In an embodiment, the public key cryptographic system used for implementation is the Niederreiter cryptosystem. In a further embodiment of the invention, a serial number being a user specific token is used to authorize access to a customer's software. In another embodiment, the security of the serial numbers is chosen such that the serial number is generally small enough for an end user to type it on a keyboard while it is secure enough to be hard to be hacked.

In a further embodiment, the structure of the plain token, e.g. the decrypted serial number is flexible in allowing product customization on a logic level such that the more expensive customization due to technology cost the harder the serial number will be to counterfeit. This is accomplished by identifying expensive product configurations with the least number of payload bits, while identifying a "cheap" product configuration with a maximum number of payload bits.

According to some embodiments, public key cryptography is used to encrypt the user specific token. Advantageously, all bits that are not required for encoding a payload, i.e. the key information, are used to increase the security. This means that the invention is an enhancement of existing public/secret key cryptography systems, like, for example, the Niederreiter cryptosystem. According to some embodiments, expensive products can be sold with tokens having a high security level and cheaper products with tokens having a lower security level. This is because typical serial numbers for cheaper products (OEM products) carry more information describing customization options. According to another aspect of the invention, the secure user specific token contains information that is directly visible to the user, this means a user can see whether he has a serial number for one version or for a different other version of a product.

According to another embodiment, an apparatus, which is part of the product or the application, decrypts an encrypted user specific token with the public key and the plain user specific token is obtained. In general, the invention provides an algorithm for generating secure user specific tokens or user access keys that are very hard to counterfeit and which provide encrypted user specific tokens with a high security level for expensive products and a lower security level for cheaper products. In embodiments, an apparatus for generating an encryptor token can be used to create the secure user specific token with a maximum level of security.

The above-described embodiments are merely illustrative for the principle of the present invention. It is understood that modifications of the arrangement and the details described herein will be apparent to others skilled in the art. It is intended therefore to be limited only by the scope of the appending patent claims and not by the specific details presented by way of description and explanation of the embodiments herein.

According to some aspects some embodiments of the invention can be summarized as follows. A system and a method for verifying a validity of an encrypted token can create a user specific token with a maximum level of security. A system and method to create a secure user specific token with a maximum level of security wherein said user specific token consists of clear bits, structure bits, information bits, random bits, and trial bits. A system and method to create a secure user specific token with a maximum level of security wherein said token contains less total bits than the corresponding insecure representation. A system and method to create a user specific token with a maximum level of security, wherein said user specific token consists of clear bits, structure bits, information bits, random bits, and trial bits and contains less total bits than the corresponding insecure representation. A system and method to validate a user specific token with a maximum level of security. A system and method to validate a user specific token with a maximum level of security, wherein consists of clear bits, structure bits, information bits, random bits, and trial bits. A system and method to validate a user specific token with a maximum level of security, wherein said token contains less total bits than the corresponding insecure representation. A system and method to verify a user specific token with a maximum level of security, wherein said token consists of clear bits, structure bits, information bits, random bits, and trial bits and contains less total bits than the corresponding insecure representation. A secure representation of a user specific token with a maximum level of security. A secure representation of a user specific token with a maximum level of security that consists of clear bits, structure bits information bits, random bits and trail bits. A secure representation of a user specific token with a maximum level of security that consists of clear bits, structure bits information bits, random bits and trail bits and contains less total bits than the corresponding insecure representation.

In addition, some of the FIGS. 1 though 8 are illustrated as block diagrams of an apparatus. These Figs. simultaneously are illustrations of a method where the block functionalities correspond to the method steps.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive method when the computer program runs on a computer. In other words, the inventive methods can, therefore, be a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for generating an encrypted token associated to a product, the apparatus comprising:
   a plain token generator for generating a plain token, wherein the plain token generator is configured to generate a plain token comprising information bits related to the product;
   wherein the plain token generator is configured to generate a plain token comprising structure bits related to a predetermined condition for verifying a validity of the encrypted token;
   wherein the plain token generator is configured to generate structure bits, which fulfils a predetermined condition;
   an encryptor for encrypting the plain token using an encryption key to acquire an encrypted token; and
   wherein the plain token generator is configured to determine a higher number of information bits when a first subset of functions of the product comprising less, less expensive or less complicated functions to be usable, is generated and to determine a lower number of information bits when a second subset of functions of the product comprising more, more expensive or a more complicated functions to be usable, is generated.

2. Apparatus according to claim 1, wherein the encryptor is configured to generate, by means of mapping bits being part of the plain token, an encrypted token comprising less bits than the plain token.

3. Apparatus according to claim 1, wherein the plain token generator is configured for determining a number of structure bits based on an intended retail price of the product, wherein the plain token generator is configured to generate a higher number of structure bits for a higher retail price and a comparatively lower number of bits for a comparatively lower retail price, wherein the product comprises a set of functions.

4. Apparatus according to claim 1, wherein the plain token generator is configured to generate a plain token, which additionally comprises a clear bit section and a section to be encrypted, the clear bit section comprising information on the product not relating to a level of product access; and
   in which the encryptor is configured for only encrypting the section to be encrypted and not encrypting the clear bit section.

5. Apparatus according to claim 1, wherein the plain token generator is configured for generating at least one trial bit in addition to the information bits and the structure bits, wherein the structure bits do not depend on a bit value of the at least one trial bit;
   wherein said encryptor is configured for performing an encryption operation resulting in a number of bits of the encrypted token being smaller than a number of bits of the plain token; and
   wherein the encryptor is configured to determine whether an encrypted token exists for a first value of the at least one structure bit and to determine whether an encrypted token exists for a second value of the at least one trial bit when an encrypted token does not exist for the first value of the at least one trial bit.

6. Method for generating an encrypted token associated to a product, the method comprising:
   generating a plain token comprising information bits related to the product and comprising structure bits related to a predetermined condition for verifying a validity of the encrypted token, wherein the structure bits fulfill the predetermined condition; and
   encrypting the plain token using an encryption key to acquire an encrypted token; and
   wherein the step of generating is configured to determine a higher number of information bits when a first subset of functions of the product comprising less, less expensive or less complicated functions to be usable, is generated and to determine a lower number of information bits when a second subset of functions of the product comprising more, more expensive or a more complicated functions to be usable, is generated.

7. A non-transitory storage medium having stored thereon a computer program comprising a program code for performing a method for generating an encrypted token associated to a product, the method comprising:
   generating a plain token comprising information bits related to the product and comprising structure bits related to a predetermined condition for verifying a validity of the encrypted token, wherein the structure bits fulfill the predetermined condition; and
   encrypting the plain token using an encryption key to acquire an encrypted token; and
   wherein the step of generating is configured to determine a higher number of information bits when a first subset of functions of the product comprising less, less expensive or less complicated functions to be usable, is generated and to determine a lower number of information bits when a second subset of functions of the product comprising more, more expensive or a more complicated functions to be usable, is generated, when the computer program runs on a computer.

* * * * *